United States Patent [19]

Nishikawa et al.

[11] 4,369,852

[45] Jan. 25, 1983

[54] POWER STEERING APPARATUS FOR VEHICLES

[75] Inventors: Masao Nishikawa, Ooizumigakuen; Yoshihiko Toshimitsu, Asaka; Akira Iwasaki, Oomiya; Katsuhiko Fujimoto, Tokyo, all of Japan

[73] Assignee: Honda Giken Kogyo Kabushiki Kaisha, Tokyo, Japan

[21] Appl. No.: 226,911

[22] Filed: Jan. 21, 1981

[30] Foreign Application Priority Data

Jan. 30, 1980 [JP] Japan ................................. 55-9814

[51] Int. Cl.³ ..................... B62D 5/010; F15B 15/002
[52] U.S. Cl. ................................ 180/148; 74/388 PS; 92/136; 180/79; 180/132
[58] Field of Search ........... 180/132, 148 D, 134–139, 180/141, 146–159, 160–163, 79.3; 74/484 R, 388 PS; 92/136, 167

[56] References Cited

U.S. PATENT DOCUMENTS

| | | | |
|---|---|---|---|
| 2,711,797 | 6/1955 | Muller | 180/157 |
| 2,755,876 | 7/1956 | Muller | 180/157 |
| 3,037,485 | 6/1962 | Adams | 180/148 X |
| 3,693,747 | 9/1972 | Nishikawa | 180/143 |
| 3,698,188 | 10/1972 | Jenvey | 180/163 X |
| 3,994,361 | 11/1976 | Nishikawa et al. | 180/143 |
| 4,000,785 | 1/1977 | Nishikawa et al. | 180/143 |
| 4,154,317 | 5/1979 | Nishikawa et al. | 180/143 |
| 4,275,798 | 6/1981 | Nishikawa et al. | 180/143 |
| 4,293,051 | 10/1981 | Nishikawa | 180/143 X |
| 4,310,063 | 1/1982 | Nishikawa | 180/143 |

FOREIGN PATENT DOCUMENTS 52-40276  3/1977  Japan .................................. 92/136

Primary Examiner—Joseph F. Peters, Jr.
Assistant Examiner—M. J. Hill
Attorney, Agent, or Firm—Posnack, Roberts, Cohen & Spiecens

[57] ABSTRACT

Power steering apparatus for a vehicle comprising a rack rod operatively connected to a steering wheel and supported in a steering gear casing, the rack rod being drivable by a power cylinder consisting of an outer cylinder fixed to the steering gear casing, an inner cylinder disposed in the outer cylinder and fitted into the steering gear casing, and a piston mounted on the rack rod to divide the interior of the inner cylinder into first and second oil chambers. A control valve is mounted on the lower surface of the steering gear casing for controlling the operation of the power cylinder. The second oil chamber is in communication with the outer cylinder via the spaces between the coils of a coil spring, the inner cylinder being supported in floating state on the outer cylinder by the coil spring. A pair of parallel, annular or semi-annular oil passages are provided in that portion of the steering gear casing which is engaged with the inner cylinder. The oil passages are respectively in communication with a pair of output ports of the control valve. The oil passages are also in communication at respective upper portions thereof with the outer cylinder and the first oil chamber separately. Due to these internally provided oil passages, the number of parts and assembly steps of the apparatus can be minimized. Because the inner cylinder is supported in floating state by the coil spring on the outer cylinder, it can be kept concentric therewith so that the piston can be operated smoothly at all times. The mounting of the control valve under the gear casing leaves a large space above the gear casing for the installation of the engine.

10 Claims, 4 Drawing Figures

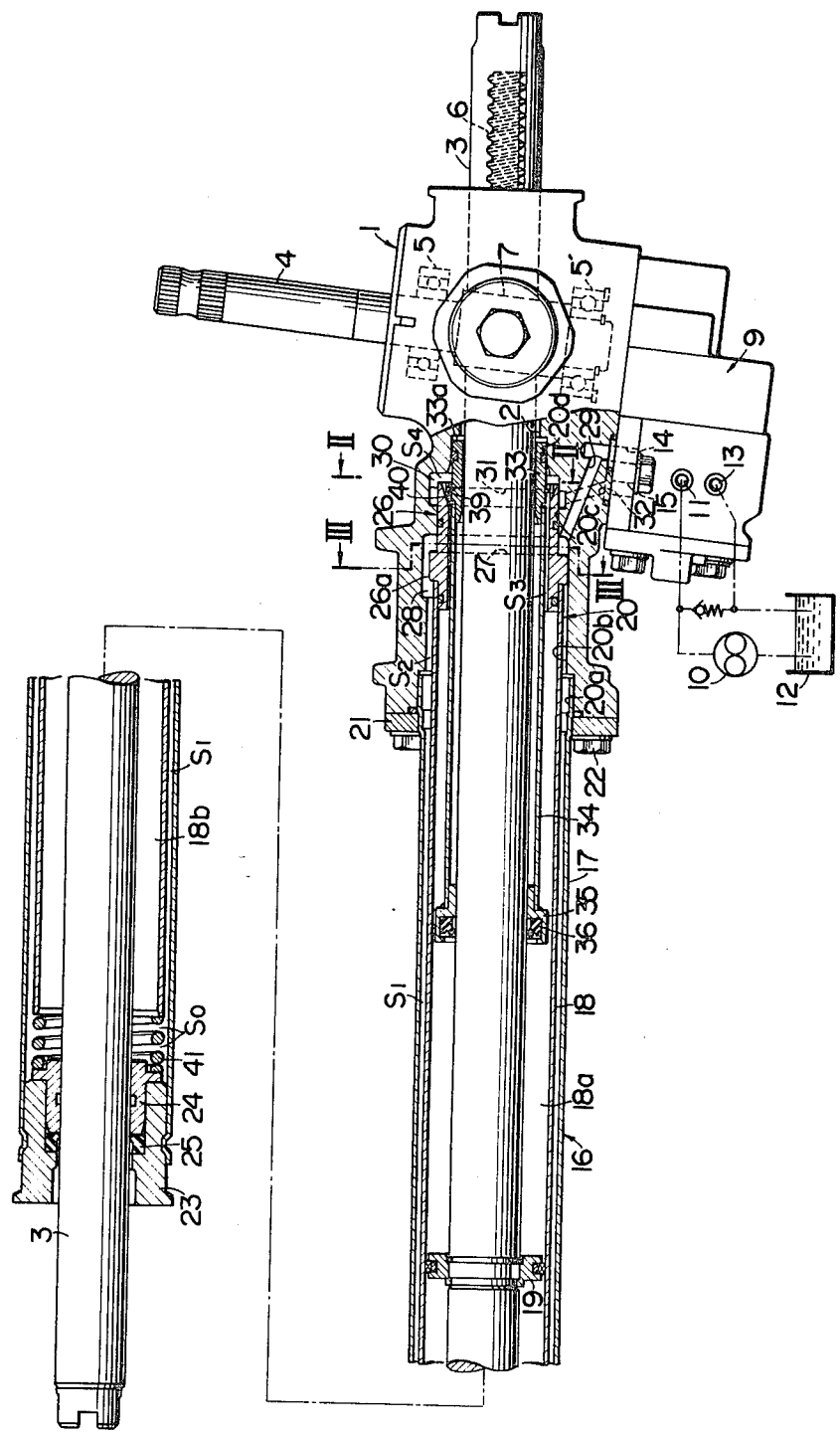
FIG. I

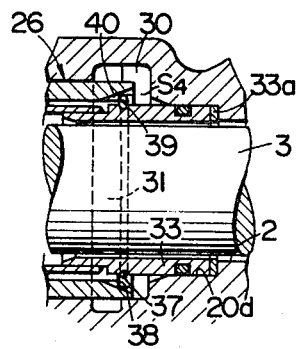
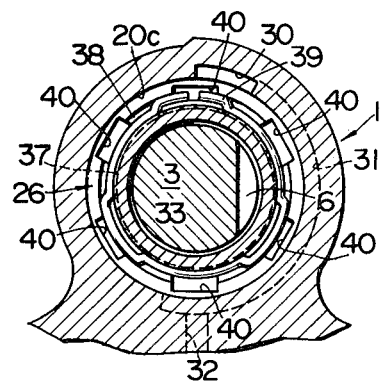
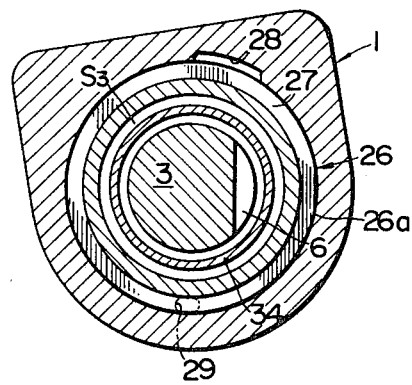

POWER STEERING APPARATUS FOR VEHICLES

BACKGROUND OF THE INVENTION

This invention relates to power steering apparatus for vehicles, such as motorcars.

Power steering apparatus of this type for motorcars is known, which comprises a rack rod operatively connected to a steering wheel and supported in a steering gear casing, a power cylinder for hydraulically driving the rack rod, and a control valve adapted to control the operation of the power cylinder and connected to the steering gear casing.

In this power steering apparatus, a pair of output ports of the control valve are in communication with left and right oil chambers of the power cylinder via respective external conduits. Accordingly, it is necessary to use such conduits and associated mounting parts therefor which leads to an increase in the number of parts and assembly steps.

SUMMARY OF THE INVENTION

An object of this invention is to provide power steering apparatus for vehicles, in which a control valve is mounted on the lower surface of a steering gear casing to provide a maximum space above the steering gear casing for installation of the engine thereat, and in which any air remaining in the power cylinder after the power steering apparatus has been assembled and bubbles generated due to an increase in the temperature of oil can be easily discharged to the ambient atmosphere through the control valve in spite of the abovementioned arrangement.

Another object of this invention is to provide a compact power steering apparatus having a reduced number of parts and assembly steps, in which oil passages connecting the oil chambers in the power cylinder with the output ports of the control valve are provided in an inner portion of the power steering device thereby to make it possible to eliminate the external conduits used in the conventional power steering apparatus.

To these ends, the present invention provides a power steering apparatus for a vehicle, comprising a rack rod operatively connected to a steering wheel and supported in a steering gear casing, a power cylinder for hydraulically driving the rack rod, and a control valve adapted to control the operation of the power cylinder and connected to the steering gear casing. The control valve is mounted at the lower surface of the steering gear casing. The power cylinder comprises an outer cylinder fixed at an inner end portion thereof to the steering gear casing, an inner cylinder disposed inside the outer cylinder and securely fitted at an inner end portion thereof to the steering gear casing, and a piston fixedly mounted on the rack rod and dividing the interior of the inner cylinder into a first oil chamber close to the steering gear casing and a second oil chamber remote from the steering gear casing, the second oil chamber being connected to the outer cylinder. A pair of parallel annular or semi-annular oil passages are provided in that portion of the steering gear casing which is in engagement with the inner cylinder, one of the oil passages being in communication with one of the output ports of the control valve, the other oil passage being in communication with the other output port of the control valve, the oil passages being in communication at their respective upper portions with the interior of the outer cylinder and the first oil chamber separately.

The above and other objects as well as advantageous features of the invention will become apparent from the following description of a preferred embodiment taken in conjunction with the accompanying drawings.

BRIEF DESCRIPTION OF THE DRAWINGS

FIG. 1 is a rear elevational view partly broken away and in section of a power steering device for a vehicle embodying the present invention;

FIG. 1A is an enlarged rear elevational view in section of that portion of the embodiment shown in FIG. 1, which is close to that portion of a steering gear casing which is in engagement with an inner end portion of an inner cylinder;

FIG. 2 is an enlarged cross-sectional view taken along line II—II in FIG. 1; and FIG. 3 is an enlarged cross-sectional view taken along line III—III in FIG. 1.

DESCRIPTION OF PREFERRED EMBODIMENT

An embodiment of the present invention will be described with reference to the accompanying drawings.

Reference numeral 1 denotes a steering gear casing fixed to a chassis (not shown) of a vehicle, such as a motorcar. The steering gear casing 1 supports the right end portion of a rack rod 3, which extends left and right therefrom, such that the rack rod 3 can be slidingly moved. The steering gear casing 1 also supports a pinion shaft 4, which extends upwardly therefrom, such that the pinion shaft 4 can be rotated via ball bearings 5, 5'. A rack 6 on the rack rod 3 and a pinion 7 mounted on the pinion shaft 4 are engaged with each other inside the steering gear casing 1. The pinion shaft 4 is rotated by a steering wheel (not shown). The rack rod 3 is driven by the pinion shaft 4 to be moved left and right in accordance with rotation of the steering wheel. The rack rod 3 is connected by a conventional mechanism (not shown) to the front steering wheels of the vehicle to turn the wheels in relation to the magnitude and direction of displacement of the rack rod 3.

A power cylinder 16 capable of hydraulically driving the rack rod 3 is connected to the left end of the steering gear casing 1, and a control valve 9 adapted to control the operation of the power cylinder 16 is mounted on the lower surface of casing 1. The control valve 9 has a high-pressure port 11 in communication with a hydraulic pressure source, such as a hydraulic pump 10 and a low-pressure port 13 in communication with an oil reservoir 12. The valve 9 also has a pair of output ports 14, 15. When the rack rod 3 is driven by the pinion shaft 4, the control valve 9 senses the driving force to connect one of the output ports 14,15 with the high-pressure port 11, and the other output port with the low-pressure port 13 in accordance with the magnitude and direction of the driving force. The construction and operation of the control valve 9 is conventional and forms no part of the invention and therefore is not described in detail.

The power cylinder 16 comprises an outer cylinder 17, an inner cylinder 18 disposed inside the outer cylinder 17, and a piston 19 fixedly mounted on the rack rod 3 and slidingly movable in the inner cylinder 18. The piston 19 divides the interior of the inner cylinder 18 into a first oil chamber 18a close to the steering gear casing 1 and a second oil chamber 18b remote from the steering gear casing 1.

The outer cylinder 17 is provided with a mounting flange 21 fixed to the outer circumferential surface at the inner end portion, i.e. the right end portion of cylinder 17. The inner cylinder 18 is provided with a support cylinder 26 joined to the inner end of the inner cylinder 18. The support cylinder 26 has an annular projection 26a on its outer circumferential surface at an intermediate portion thereof, the diameter of projection 26a being greater than that of the inner cylinder 18. The outer cylinder 17 is further provided with a bearing cup 23 fixedly fitted into the outer end portion, i.e. the left end portion, thereof. A plain bearing 24 slidably supporting the left end portion of the rack rod 3 and a seal member 25 are fitted in the bearing cap 23.

The steering gear casing 1 has at the left end portion thereof a stepped mounting port system 20 which is concentric with the rack rod 3. The stepped mounting port system 20 consists of a large diameter port 20a, a median diameter port 20b, a small diameter port 20c and a minimum diameter port 20d which are formed in succession in the mentioned order from the left end of the mounting port system 20. The inner end portion of the outer cylinder 17 is fitted in the large diameter port 20a, and the mounting flange 21 is fixed to the steering gear casing 1 with bolts 22. The annular projection 26a of the support cylinder 26 is fitted in the median diameter port 20b, and the inner end portion of the support cylinder 26 is fitted in the small diameter port 20c. A support cylinder 33 fixedly fitted into the inner end portion of a flexible partition pipe 34 is fitted in the minimum diameter port 20d. The partition pipe 34 extends into the inner cylinder 18 and is provided with a seal housing 35 at an outer end portion thereof, the seal housing 35 containing a seal member 36 therein sealably contacting the outer circumferential surface of the rack rod 3.

The inner and outer cylinders 17, 18 form therebetween a cylindrical oil passage $S_1$ which is in communication with the second oil chamber 18b at the outer end portion of the inner cylinder 18. A cylindrical oil passage $S_2$ continuing from the right end of the oil passage $S_1$ is formed between that portion of the inner surface of the steering gear casing 1 which defines the median diameter port 20b and the outer circumferential surface of the inner cylinder 18. An annular oil passage 27 is formed between the inner end section of that portion of the inner surface of the steering gear casing 1 which defines the median diameter port 20b and the annular projection 26a. The oil passage 27 is in communication at its upper portion with the cylindrical oil passage $S_2$ via a communication groove 28 provided in that portion of the inner surface of the steering gear casing 1 which defines the median diameter port 20b. The oil passage 27 is in communication at its lower portion with the output port 14 via an oil passage 29.

A cylindrical oil passage $S_3$ is formed between the partition pipe 34 and support cylinder 26 and is in communication with the first oil chamber 18a at the right end thereof. An annular oil passage $S_4$ is in communication with the oil passage $S_3$ and is formed between the inner end section of that portion of the inner surface of the steering gear casing which defines the small diameter port 20c and the outer surface of the support cylinder 26. A semi-annular oil passage 31 is formed in that portion of the inner surface of the steering gear casing 1 which defines the small diameter port 20c. The oil passage 31 extends at least one-half of the outer circumferential surface of the support cylinder 26 from an upper portion thereof to a lower portion thereof. The oil passage 31 is in communication at its upper portion with the annular oil passage $S_4$ via the communication groove 30 formed in that portion of the inner surface of the steering gear case 1 which defines the small diameter port 20c, and at its lower portion with the output port 15 via a communication passage 32.

In order to secure the annular oil passage $S_4$, which is in communication with the first oil chamber 18a, between the inner end section of that portion of the inner surface of the steering gear casing 1 which defines the small diameter port 20c and the support cylinder 26 for the inner cylinder 18, an axial position-setting means which will be described later is provided in the inner cylinder 18.

The support cylinder 26 is provided in the inner end portion of the inner circumferential surface thereof with an annular recess 38 and a plurality of circularly arranged recesses 40 diagonally crossing the annular recess 38. The support cylinder 33 for the partition pipe 34 is provided in the outer circumferential surface thereof with an annular engagement recess 37 in opposition to the annular recess 38. An outer circumferential portion of an elastic stop ring 39 fitted in the recess 37 is engaged with the annular recess 38 to restrict the axial position of the support cylinder 33 to the left. The stop ring 39, which is best seen in FIG. 2, consists of a circularly extending elastic wire, which is radially waved such that communication between the oil passages $S_3$, $S_4$ is not prevented by the ring 39. The communication between the passages $S_3$ and $S_4$ is ensured by the recesses 40. The elastic stop ring 39 permits the support cylinder 33 to be moved slightly in the radial direction. The mounting and construction of the stop ring 39 constitutes the axial position-setting means described previously.

A coil spring 41 is mounted between the bearing cap 23 fitted in the outer end portion of the outer cylinder 17 and the outer end of the inner cylinder 18, the coil spring 41 serving to support the inner cylinder in a floating state. The resilient force of the spring 41 also serves to maintain the engagement between the stopper ring 39 and the support cylinder 26, and to urge the support cylinder 33 for the partition pipe 34 at the inner end surface thereof against the steering gear casing 1. A seat plate 33a is inserted between the inner end surface of the support cylinder 33 and the opposite surface of the steering casing. The coil spring 41 consists of a wire wound at a constant pitch $S_0$ which is large enough to maintain the communication between the second oil chamber 18b in the inner cylinder 18 and the cylindrical oil passage $S_1$ in the outer cylinder 17.

The operation of this embodiment will be described hereafter.

When the operator turns the pinion shaft 4 clockwise by the steering wheel, the control valve 9 is actuated to allow the output port 15 to be in communication with the high-pressure port 11, and the output port 14 with the low-pressure port 13. As a result, pressure oil flows from the hydraulic pressure source 10 into the first oil chamber 18a in the inner cylinder 18 through the output port 15, oil passage 32, semi-annular oil passage 31, communication groove 30, annular oil passage $S_4$, recesses 40 and cylindrical oil passage $S_3$ in the mentioned order. Consequently, the piston 19 is displaced to the left, and the force on the piston assists the operating force applied by the operator to the rack rod 3 via the pinion shaft 4. This allows the rack 6 to be moved to the left easily. At this time, the oil in the second oil chamber 18b returns to the oil reservoir 12 through the spaces $S_0$ of a constant width in the coil spring 41, cylindrical oil passages $S_1$, $S_2$, communication groove 28, annular oil passage 27, oil passage 29, output port 14 and low pressure port 13.

When the pinion shaft is rotated counter-clockwise, the control valve 9 is actuated in the direction opposite to that previously described. Accordingly, the oil flows through the above-mentioned passages in the opposite direction. In other words, the pressure oil from the hydraulic pressure source 10 flows via port 14 into the second oil chamber 18b, while the oil in the first oil chamber 18a returns via port 15 to the oil reservoir 12. As a result, the rack rod 3 is moved to the right with power assist.

During the return of the oil from the first oil chamber 18a or the second oil chamber 18b into the oil reservoir 12, the oil flows from the highest portion of the oil chamber 18a or 18b into the annular oil passage 27 or the semi-annular oil passage 31 via the communication groove 28 or 30, and the oil then flows downwardly. Consequently, air or bubbles generated in the oil chamber 18a or 18b never remain in the upper portion of the chamber; the air or bubbles are necessarily and speedily discharged with the return oil into the oil reservoir 12. At this time, the air in the oil floats to the surface to be discharged to the ambient atmosphere.

Should lateral deflection occur in the rack rod 3 due to steering resistance which the steering wheel receives from the road surface during operation of the power cylinder 16, the piston 19 will be displaced sideways and the inner cylinder 18 which is supported in floating state at its outer end by the spring 41 can be oscillated with the piston 19. As a result, the normal concentric relation between the piston 19 and the inner cylinder 18 is retained so that the piston 19 can be smoothly slidingly moved in the inner cylinder 18. Since the partition pipe, which is made of a flexible material, is also moved in accordance with the deflection of the rack rod 3, the seal member 36 retains its sealing effect with respect to the rack rod 3 so that oil leakage from the first oil chamber 18a can be prevented.

According to the present invention, which has been described in detail above, the power cylinder comprises outer cylinder 17 firmly fixed at its inner end portion to the steering gear casing 1, inner cylinder 18 disposed inside the outer cylinder and securely fitted at its inner end portion in the steering gear casing, and piston 19 fixedly mounted on rack rod 3 and dividing the interior of the inner cylinder into first oil chamber 18a close to the steering gear casing and second oil chamber 18b remote from the steering casing. The inner cylinder 18 is supported in a floating state at its outer end on the outer cylinder 17 via coil spring 41 and the second oil chamber 18b and the interior of the outer cylinder are in communication with each other via spaces $S_0$ of constant width in the coil spring. In addition, oil passages for connecting the output ports 11,13 of control valve 9 with the first oil chamber and the interior of the outer cylinder are formed in the steering gear casing. In other words, all of the oil passages for connecting the output ports with the first and second oil chambers are formed within the power steering device. This makes it unnecessary to provide external conduits as in the conventional power steering apparatus of this type. Consequently, the number of parts and assembly steps can be reduced, and a compact power steering apparatus can be obtained. The communication between the second oil chamber and the interior of the outer cylinder 17 is achieved by utilizing coil spring 41 by which the inner cylinder is supported in the floating state. This communication means is simply constructed and can be easily assembled. Furthermore, when deflection occurs in the elongated rack rod 3 due to steering resistance, the inner cylinder 18 supported in floating state can be displaced sideways freely while retaining in the outer cylinder a normal concentric relation with the piston. Therefore, a smooth hydraulic operation of the piston can be effected at all times, and accurate power steering can be carried out. Since the control valve 9 is provided on the lower surface of the steering gear casing, an unencumbered space is obtained above the steering gear casing for installing the engine therein.

The pair of annular or semi-annular parallel oil passages 27,31 which are in communication with the output ports 14,15 separately are provided in that portion of the steering gear casing which is in engagement with the inner cylinder. These oil passages are in communication at their respective upper portions with the first oil chamber 18a and the interior of the outer cylinder, which is in communication with the second oil chamber 18b, separately. Consequently, any air remaining in the power cylinder after the power steering apparatus has been assembled and bubbles occurring due to an increase in the temperature of the oil can be speedily discharged, while the power cylinder is operated, to the oil reservoir with the oil returned thereto from the power cylinder. Accordingly, air and bubbles never remain in the oil chambers despite the mounting of the control valve under the steering gear casing, so that the power cylinder can always be normally operated.

The present invention is not, of course, limited to the above embodiment; it may be modified in various ways within the scope of the appended claims.

What is claimed is:

1. Power steering apparatus for a vehicle comprising a steering gear casing, a rack rod operatively connected to a steering wheel and slidably supported in said steering gear casing, a power cylinder connected for hydraulically driving said rack rod, control valve means connected to said steering gear casing for controlling the operation of said power cylinder, said control valve means having two output ports respectively and selectively connected to a fluid pressure source and a fluid return line to said source, said power cylinder comprising an outer cylinder fixed at an inner end portion thereof to said steering gear casing, an inner cylinder disposed inside said outer cylinder and secured at an inner end portion thereof to said steering gear casing, and a piston fixedly mounted on said rack rod and dividing the interior of said inner cylinder into a first fluid chamber close to said steering gear casing and a second fluid chamber remote from said casing, means including a coil spring supporting said inner cylinder in a floating state at its outer end on said outer cylinder, said coil spring having windings forming spaces of constant width therebetween, said second fluid chamber and the interior of said outer cylinder being in communication with each other via said spaces of constant width in said coil spring, and passage means for providing communication between said output ports of said control valve means and said first fluid chamber and the interior of said outer cylinder separately, said passage means being provided in said steering gear casing.

2. Power steering apparatus as claimed in claim 1 wherein said casing includes an annular portion receiving said inner and outer cylinders, said passage means comprising first and second fluid passages extending at least partially in said casing along at least a portion of the annular extent thereof.

3. Power steering apparatus as claimed in claim 2 wherein said inner cylinder includes a support cylinder fixed to said inner cylinder, said support cylinder defining with said casing first and second connection means for establishing communication between said first and second fluid passages and said outer cylinder and first chamber respectively.

4. Power steering apparatus as claimed in claim 3 comprising axial position-setting means for the support cylinder with respect to said casing.

5. Power steering apparatus as claimed in claim 3 wherein said first connection means comprises a groove means between said support cylinder and said casing, said support cylinder including an annular projection engaging said casing and projecting into said groove means to form therewith said first connection means.

6. Power steering apparatus as claimed in claim 3 wherein said second connection means comprises a groove means between said support cylinder and said casing, said groove means being in communication with said first chamber via an annular fluid passage provided in said casing, a plurality of circularly arranged recesses in said support cylinder and an annular recess in said support cylinder in communication with said first chamber, said circularly arranged recesses being inclined with respect to said annular recess and providing communication between said annular recess and said annular fluid passage.

7. Power steering apparatus as claimed in claim 6 comprising resilient stop ring means between said support cylinder and said casing for establishing an axial position between the support cylinder and casing while maintaining communication between said groove means and said first chamber.

8. Power steering apparatus for a vehicle comprising a steering gear casing, a rack rod operatively connected to a steering wheel and slidably supported in said steering gear casing, a power cylinder connected for hydraulically driving said rack rod, said casing having a lower surface, and control valve means mounted on the lower surface of said steering gear casing for controlling the operation of said power cylinder, said control valve means having two output ports respectively and selectively connected to a fluid pressure source and a fluid return line, said power cylinder comprising an outer cylinder fixed at an inner end portion thereof to said steering gear casing, an inner cylinder disposed inside said outer cylinder and extending at an inner end portion thereof into said steering gear casing, and a piston fixedly mounted on said rack rod and dividing the interior of said inner cylinder into a first fluid chamber close to said steering gear casing and a second fluid chamber remote from said steering gear casing, said second fluid chamber being in communication with said outer cylinder, a pair of fluid passages in communication with said output ports of said control valve means and at respective upper portions thereof with the interior of said outer cylinder and said first chamber separately, said pair of fluid passages extending at least semi-annularly in that portion of said steering gear casing which is in engagement with said inner cylinder, and a pair of communication passages in said portion of the steering gear casing providing communication between said fluid passages and the output ports of said control valve means.

9. Power steering apparatus for a vehicle according to claim 8, comprising a support cylinder secured to the end of said inner cylinder adjacent said steering gear casing, said support cylinder defining at its outer periphery a communication groove providing communication between said outer cylinder and one of said semi-annularly extending passages, and at its inner periphery a cylindrical passage providing communication between said first fluid chamber and the other of said semi-annularly extending passages; a resilient ring means mounted on said rack rod for resiliently supporting said support cylinder for limited radial movement; and a biasing means disposed at that end of said inner cylinder remote from said steering gear casing for biasing said inner cylinder toward said steering gear casing.

10. Power steering apparatus for a vehicle according to claim 9, wherein said support cylinder is provided at its inner peripheral surface with an annular recess and a plurality of circularly arranged recesses; said resilient ring means comprising a circularly extending elastic wire engaged in said annular recess, said wire being of radially waved configuration to provide fluid communication between said cylindrical passage and the other of said semi-annularly extending passages.

* * * * *